Oct. 23, 1962   R. J. MORSE   3,059,975
RELAY EMERGENCY VALVE
Filed Aug. 20, 1958
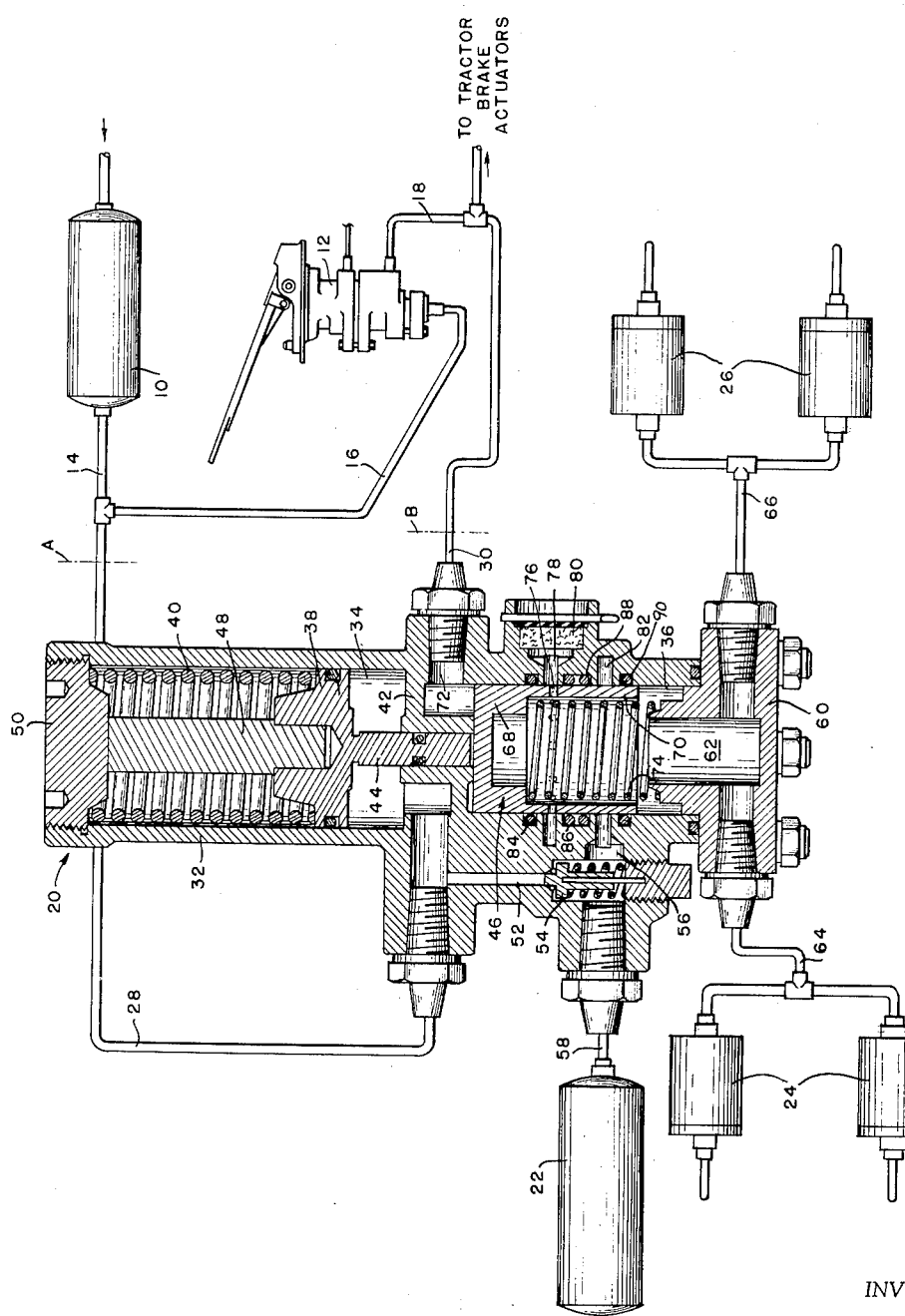
INVENTOR
ROBERT J. MORSE
BY
ATTORNEY

United States Patent Office 3,059,975
Patented Oct. 23, 1962

3,059,975
RELAY EMERGENCY VALVE
Robert J. Morse, Elyria, Ohio, assignor to Bendix-Westinghouse Automotive Air Brake Company, Elyria, Ohio, a corporation of Delaware
Filed Aug. 20, 1958, Ser. No. 756,153
4 Claims. (Cl. 303—29)

This invention relates to fluid pressure vehicle brake systems and more particularly to a new and improved relay emergency valve for use in such systems.

The principal object of the present invention is to provide for automatic actuation of the vehicle brakes in the event of a pressure drop in the main reservoir below a predetermined low value.

Another object of the invention is to provide an automatic brake controlling valve means so constituted that on initial system pressure build-up there is a simultaneous pressure build-up in the brake actuators to a predetermined limit after which the brake actuator pressure is automatically released.

A further object of the invention is to provide a novel relay emergency valve which is effective to automatically apply the vehicle brakes at a predetermined low pressure limit during an emergency brake application to a degree which is substantially inversely proportional to the pressure in the main reservoir or emergency line of the brake system.

Another object of the invention is to provide a novel arrangement wherein a relatively gradual automatic emergency brake application will occur at a predetermined low pressure limit when there is a slow leak in the system and a full pressure emergency brake application will be secured when the system emergency line is broken.

Still another object is to provide a novel and simplified relay valve in an arrangement of the above character, which includes a unitary relay piston and valve device and thus avoids the necessity of utilizing pressure operated diaphragms and separate valve devices as in relay emergency valves heretofore used.

Still another object is to provide a novel unitary relay piston and valve device which comprises a hollow piston member having a plurality of openings formed in the wall thereof, such openings cooperating with sealing rings to function as exhaust and inlet valves during travel of the piston member in opposite directions.

The above and other objects of the invention will appear more fully hereinafter from the following detailed description when taken in connection with the accompanying drawing, wherein one form of the invention is illustrated It is to be expressly understood however, that the drawing is utilized for purposes of illustration only and is not to be taken as a definition of the limits of the invention, reference being had for this latter purpose to the appended claims.

In the drawing, the single FIGURE illustrates diagrammatically a fluid pressure brake system of the compressed air type, the relay emergency valve being shown in section.

As shown, the fluid pressure braking system includes a main reservoir or source of fluid pressure 10 adapted to be supplied with compressed air from a suitable compressor, not shown, and a brake valve 12 of well-known construction, operation of the latter being effective to control the application of fluid pressure to tractor brake actuators by way of emergency line 14 and conduits 16 and 18. For purposes of illustration the invention has been illustrated in connection with a braking system for tractor-trailer vehicles and parts of the system to the right of the broken lines A and B indicate parts on the tractor, while those to the left of lines A and B indicate parts on the trailer. Thus, it will be seen that the trailer braking system includes the novel relay emergency valve 20, the auxiliary or emergency reservoir 22 and the trailer brake actuators 24 and 26. Conduits 14 and 18 are the tractor emergency and service lines respectively of the system and it will be understood that these are respectively connected through conventional couplings with the emergency and service lines 28 and 30 on the trailer.

The novel relay emergency valve 20 includes a body 32 having an upper chamber 34 and a lower chamber 36. An emergency piston 38 is movably mounted in the upper chamber 34 and is constantly subjected to the pressure within the emergency line 28 in order to move the piston against the tension of a spring 40 to the position shown. The chambers 34 and 36 are separated by a partition 42 through which a piston rod 44 extends, the said rod being integral with or otherwise secured to the emergency piston 38, and the lower end thereof being adapted to engage and move the novel combined relay and valve member 46 in a manner to be described more fully hereinafter. A stop member 48 is suitably secured to the piston 38 to contact a cap 50 to thus limit the upward movement of the piston. With this construction it will be readily understood that as the main reservoir pressure and hence the pressure in the emergency line builds up, the pressure in the upper chamber 34 will gradually increase to the point where the emergency piston 38 is finally moved to the position shown and the rod 44 will be moved out of contact with the relay and valve member 46.

As shown, the body 32 is provided with a passage 52 for connecting the emergency line 28 and the emergency reservoir 22 past a one-way check valve 54, inlet opening 56 and conduit 58. A cap 60 is secured to the lower portion of the body 32 to close the lower chamber 36, the latter being in constant communication with the brake chambers 24 and 26 by way of an outlet opening 62 formed in the cap 60 and conduits 64 and 66 communicating with said outlet opening.

The novel combined relay and valve member 46 combines the functions of a fluid pressure responsive device and inlet and exhaust valves to control the application and exhaust of fluid pressure from the reservoir 22 to the brake chambers 24, 26 in response to variations in pressure in the service line 30. As illustrated the member 46 is formed as a hollow piston member 68 having a depending skirt 70, the piston member being adapted to be subjected to the pressure in the service line 30 by way of the control opening 72 in constant communication with the upper portion of the lower chamber 36 above the piston member 68. In the position shown, a relatively light spring 74 serves to move the piston member 68 upwardly in contact with the lower side of the partition 42 whereby the outlet chamber 62 and hence the brake chambers 24 and 26 are exhausted to atmosphere through a plurality of openings 76 formed in the wall of the skirt 70 which register with an annular exhaust groove 78 which in turn is in constant communication with a filtered exhaust or atmospheric opening 80. In this position of the piston member 68, communication between the inlet opening 56 and the outlet chamber 62 by way of the annular inlet groove 82 is cut off by the lower portion of the skirt 70. Upon increase of pressure in the service line 30 however, the piston member 68 will be moved downwardly to interrupt communication between the openings 76 and the exhaust groove 78 and establish communication between the reservoir 22 and the brake chambers 24, 26 as soon as the openings 76 register with the inlet groove 82. Leakage of fluid pressure past the surface of the piston member 68 in contact with the interior wall of the lower chamber 36 is prevented by two pairs of O-ring type rubber sealing rings or grommets, one pair shown at 84 and 86 being disposed in grooves in the wall of the chamber 36 and respectively positioned on opposite sides of the exhaust groove 78, and the other pair shown at 88 and 90 being positioned in grooves in the wall of chamber 36 and respectively positioned on opposite sides of the inlet groove 82. The cross-sectional diameters of such sealing rings is greater than the diameter of the openings 76 in order to provide effective sealing and eliminate scuffing of the rings during travel of the piston member 68 in the chamber 36.

It is desired to point out that the action of the member 46 in controlling the actuation of the brake actuators 24, 26 is self-lapping in character. For example, assume that the control opening 72 is charged to a selected value in order to apply the trailer brakes a predetermined amount. Piston member 68 will be first moved downwardly to cut off communication between the openings 76 and the exhaust groove 78 and then connect the openings 76 with the inlet groove 82 as soon as the openings 76 pass below the sealing ring 88 and finally register with the inlet groove 82. Fluid pressure will thereupon be conducted from the reservoir 22 to the brake chambers 24, 26 by way of conduit 58, inlet opening 56, inlet groove 82, openings 76, chambers 36 and 62 and conduits 64, 66. As soon, however, as the pressure in the chamber 36 beneath the piston member 68 builds up to a value approaching the pressure in the control opening 72, the piston member 68 will be moved upwardly and finally come to rest in a lapped position where further passage of fluid pressure from the emergency reservoir 22 to the chamber 36 will be interrupted. At this time, the openings 76 will be sealed by the sealing ring 88. Upon release of pressure from the control opening 72, piston member 68 will be returned to the position illustrated whereupon the brake actuators 24, 26 will be exhausted as heretofore described.

In operation, and assuming that there is no compressed air in the system, the emergency piston 38 will be moved downwardly in the chamber 34 by the spring 40, and the lower end of the rod 44 will engage and move the piston member 68 downwardly in the chamber 36 to a position where the openings 76 are aligned with the inlet groove 82. As pressure builds in the main reservoir 10, it will also build up in the chamber 34, the emergency reservoir 22, the chamber 36 and the brake actuators 24, 26, thus maintaining the trailer brakes in applied condition. It is desired to point out here that the effective area of the emergency piston 38 is slightly greater than that of the piston member 68 and that the tension of the spring 40 is greater than that of the spring 74. During continued build-up of pressure, the piston 38 will gradually move upwardly in response to increased pressure in both the chambers 34 and 36 to overcome the spring 40, assisted by the spring 74. When this occurs, the relay piston member 68 will move to lapped position to trap about 40 p.s.i. in the brake actuators 24, 26 with the parts proportioned as illustrated. At about 60 p.s.i., the emergency and relay pistons 38 and 68 are moved to the upper limits of their travel and the brake actuators 24, 26 are exhausted to atmosphere when the openings 76 register with the exhaust groove 78.

When the system is fully charged, the parts assume the position shown and the emergency piston has no influence on the functioning of the combined relay and valve member 46. Hence, when the brake valve 12 is operated to supply a determined amount of fluid pressure from the main reservoir 10 to the tractor brake actuators in a manner well known in the art, the service line 30 and the control opening 72 will likewise be charged with fluid pressure to operate the relay piston member 68 in the manner heretofore described. Downward movement of the member 68 to charge the brake actuators 24, 26 will be followed by upward movement thereof to the lapped position as previously set forth.

In the event that a slow leak develops in the system and the pressure in the emergency line 28 and chamber 34 drops slowly, it will be understood that the emergency spring 40 will gradually lower the emergency piston 38 and the relay piston 68 and will gradually and automatically apply the trailer brakes as soon as the openings 76 pass below the sealing ring 88. With the parts arranged as illustrated, the degree of fluid pressure energization of the trailer brake actuators will be substantially inversely proportional to the pressure in the emergency line 28 and hence in the emergency chamber 34. On the other hand, should the emergency lines 28 and 14 be parted or either of these lines or the main reservoir become ruptured, the emergency spring 40 will promptly move the emergency piston 38 and the relay piston 68 downwardly to apply full reservoir pressure from the emergency reservoir 22 to the brake actuators 24, 26.

While the invention has been shown and described herein with considerable particularity, it is to be clearly understood that the same is not limited to the form illustrated but may receive a variety of mechanical expressions, as will readily appear to those skilled in the art. Reference will therefore be had to the appended claims for a definition of the limits of the invention.

What is claimed is:

1. A relay emergency valve for controlling the application of pressure from a source of pressure to brake chambers in response to pressure variations in a service line and effective for establishing application of pressure from said source to said brake chambers in response to a reduction in pressure in an emergency line to a predetermined value, comprising a body having a chamber therein, a combined and unitary relay piston and valve slidably mounted in said chamber comprising a hollow piston member having a depending skirt provided with a plurality of openings, an inlet passage in said body communicating with said source, an exhaust passage in said body spaced from said inlet passage, a pair of sealing rings carried by the body respectively disposed on opposite sides of said inlet passage and frictionally engaging said piston member, a second pair of sealing rings carried by the body and respectively disposed on opposite sides of the exhaust passage and frictionally engaging the piston member, said chamber and piston member being subjected to fluid pressure from said service line so that the piston member is movable in one direction in response to an increase in pressure in said service line and chamber to bring said openings in registry with said inlet passage to connect said source and brake chambers and is movable in the opposite direction in response to a decrease in pressure in said service line and chamber to bring said openings in registry with said exhaust passage to exhaust the brake chambers, an emergency piston in said body constantly subjected to the pressure in the emergency line, and resilient means to move said emergency piston and said combined relay piston and valve in said one direction when the pressure in the emergency line is reduced to a predetermined value.

2. A relay emergency valve for controlling the application of pressure from a source of pressure to brake chambers in response to pressure variations in a service line and effective for establishing application of pressure from said source to said brake chambers in response to a reduction in pressure in an emergency line to a predetermined value, comprising a body having a chamber therein, a combined and unitary relay piston and valve slidably mounted in said chamber comprising a hollow piston member having a depending skirt provided with a plurality of openings, an inlet passage in said body communicating with said source, an exhaust passage in said body spaced from said inlet passage, a pair of sealing rings carried by the body respectively disposed on opposite sides of said inlet passage and frictionally engaging said piston member, a second pair of sealing rings carried by the body and respectively disposed on opposite sides of the exhaust passage and frictionally engaging the piston member, said chamber and piston member being subjected to fluid pressure from said service line so that the piston member is movable in one direction in response to an increase in pressure in said service line and chamber to bring said openings in registry with said inlet passage to connect said source and brake chambers and is movable in the opposite direction in response to a decrease in pressure in said service line and chamber to bring said openings in registry with said exhaust passage to exhaust the brake chambers, means including a spring for moving said combined relay piston and valve in said one direction independently of the pressure variations in said service line, and means actuated by pressure in said emergency line for preventing the operation of said last named moving means when the pressure in the emergency line exceeds a predetermined value.

3. A relay emergency valve for controlling the application of pressure from a source of pressure to brake chambers in response to pressure variations in a service line and effective for establishing application of pressure from said source to said brake chambers in response to a reduction in pressure in an emergency line to a predetermined value, comprising a body provided with an upper chamber constantly subjected to emergency line pressure and a lower chamber, a partition separating said chambers, an inlet groove formed in the wall of the lower chamber constantly connected to said source, an exhaust groove formed in the wall of the lower chamber and spaced above the inlet groove, said lower chamber having a connection with the brake chambers, a combined and unitary relay piston and valve in said lower chamber comprising a hollow piston member having a skirt provided with a plurality of openings, resilient means for normally moving said relay piston and valve upwardly in said lower chamber where said openings register with said exhaust groove and connect the brake chambers with atmosphere, the said skirt interrupting communication between the inlet groove and the brake chambers when the relay piston is moved upwardly, said relay piston and valve being subjected to pressure variations in the service line for downward movement in the lower chamber to cut off communication between the brake chambers and atmosphere and connect said openings and the inlet groove to conduct pressure from said source to the brake chambers, an emergency piston slideably mounted in said upper chamber and having a part slideable within an opening in said partition, and resilient means for moving the emergency piston downwardly in said upper chamber whereby said part engages and moves said combined relay piston and valve downwardly when the pressure in the emergency line is reduced to a predetermined value.

4. The relay and emergency valve of claim 3 which includes in addition, a pair of sealing rings carried by the body respectively disposed on opposite sides of said inlet groove and frictionally engaging said piston member, and a second pair of sealing rings carried by the body and respectively disposed on opposite sides of the exhaust groove and frictionally engaging the piston member.

References Cited in the file of this patent

UNITED STATES PATENTS

| | | |
|---|---|---|
| 890,931 | Rowntree | June 16, 1908 |
| 1,973,326 | Besler | Sept. 11, 1934 |
| 2,212,913 | Breese | Aug. 27, 1940 |
| 2,212,918 | Hukill | Aug. 27, 1940 |
| 2,289,559 | Turek | July 14, 1942 |
| 2,441,050 | Wiegers | May 4, 1948 |
| 2,656,014 | Fites | Oct. 20, 1953 |
| 2,832,646 | Fites | Apr. 29, 1958 |
| 2,859,763 | Fites | Nov. 11, 1958 |